United States Patent [19]

Bradshaw et al.

[11] Patent Number: 5,027,388
[45] Date of Patent: Jun. 25, 1991

[54] METHOD OF SELECTING THE MOST COST EFFECTIVE CELLULAR SERVICE PLAN PROVIDED BY CELLULAR TELEPHONE RESELLERS TO MULTI-LINE CUSTOMERS

[75] Inventors: Andrea E. Bradshaw, Schaumburg, Ill.; David M. Baum, Alexandria, Va.; Dionne A. Rivera, Glendale Heights, Ill.

[73] Assignee: Motorola, Inc., Schaumburg, Ill.

[21] Appl. No.: 532,132

[22] Filed: Jun. 1, 1990

Related U.S. Application Data

[63] Continuation-in-part of Ser. No. 473,787, Feb. 1, 1990, Pat. No. 4,979,207.

[51] Int. Cl.⁵ .................... H04M 7/16; H04M 15/06
[52] U.S. Cl. .................................. 379/112; 379/120; 379/126; 379/135
[58] Field of Search ............... 379/112, 111, 116, 119, 379/120, 121, 126, 127, 134, 135, 133, 59

[56] References Cited

U.S. PATENT DOCUMENTS 4,640,986  2/1987  Yotsutani et al. ............ 379/126 X Primary Examiner—Stafford D. Schreyer
Attorney, Agent, or Firm—Rolland R. Hackbart

[57] ABSTRACT

A unique cellular telephone billing system (100) processes call detail records (102) of cellular telephone calls made by users of multi-line customers to produce invoices and reports containing consolidated billing, usage and cost information for the current and other eligible cellular service plans. The call detail records (301 and 302) for each user of a multi-line customer include a unique key identification number (311 and 321) and may include an information format (401 and 402) having variable-length sub-fields (411–415 and 421–423). A candidate file (136) is created from the customer detail pool file (112) by including active user records for multi-line customers and usage data is accumulated in summary records for each user. Eligible cellular service plans are identified for each user in the candidate file and costs for accumulated usage data are estimated under the current and eligible cellular service plans. The estimated costs for the current and eligible cellular service plans may then be compared to determine the most cost effective service plan for each user on the basis of current average usage or rate plan level, account level or market level aggregate average usage. Reports may be generated for each multi-line user illustrating consolidated billing, usage and cost information by sorting on the basis of the corresponding key identification number and information format.

7 Claims, 13 Drawing Sheets

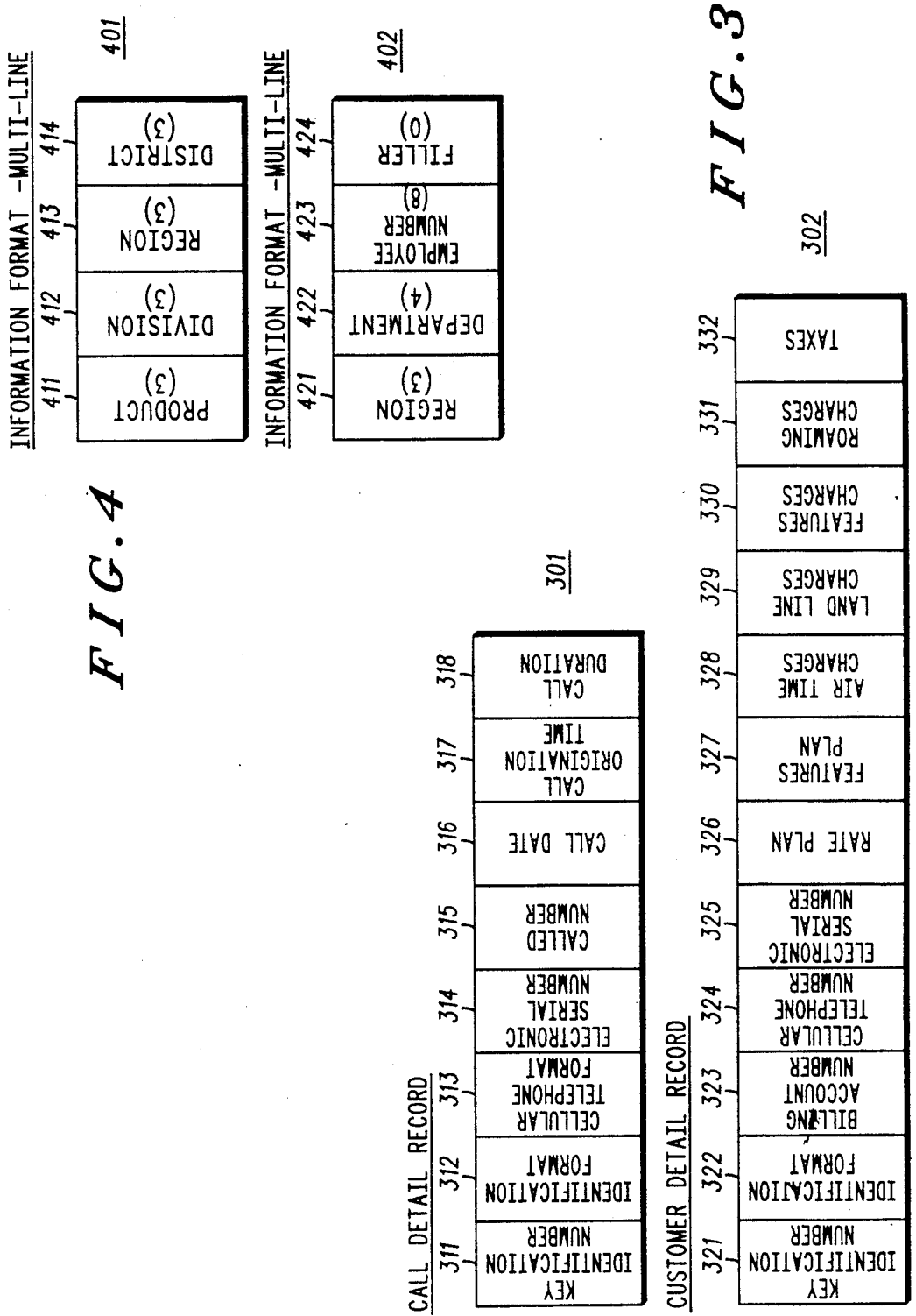

FIG.10A

CANDIDATE FILE/RATE PLAN ANALYSIS FILE RECORD STRUCTURE

GENERAL DATA ELEMENTS

- 911 — KEY IDENTIFICATION NUMBER
- 912 — INFORMATION FORMAT
- 913 — GEOGRAPHIC SERVICE MARKET
- 914 — CARRIER IDENTIFICATION CODE
- 915 — CELLULAR TELEPHONE NUMBER
- 916 — BILLING ACCOUNT NUMBER
- 917 — USER NAME
- 918 — CURRENT RATE PLAN
- 919 — ACCESS COMPUTATION FLAG
- 920 — USAGE COMPUTATION FLAG
- 921 — ACTIVATION DATE
- 922 — ESTIMATED BASELINE COST

PERIODIC DATA ELEMENTS

- 931 — MONTH 1 AIRTIME PERIOD 1 USAGE
- 932 — MONTH 1 AIRTIME PERIOD 2 USAGE
- 933 — MONTH 1 AIRTIME PERIOD 3 USAGE
- 934 — MONTH 1 DATA EXCLUSION FLAG
- 935 — MONTH 1 RATE PLAN CHANGE FLAG
- 936 — MONTH 1 RATE PLAN
- 937 — MONTH 2 AIRTIME PERIOD 1 USAGE
- 938 — MONTH 2 AIRTIME PERIOD 2 USAGE
- 939 — MONTH 2 AIRTIME PERIOD 3 USAGE
- 940 — MONTH 2 DATA EXCLUSION FLAG
- 941 — MONTH 2 RATE PLAN CHANGE FLAG
- 942 — MONTH 2 RATE PLAN

- 943 — MONTH 3 AIRTIME PERIOD 1 USAGE
- 944 — MONTH 3 AIRTIME PERIOD 2 USAGE
- 945 — MONTH 3 AIRTIME PERIOD 3 USAGE
- 946 — MONTH 3 DATA EXCLUSION FLAG
- 947 — MONTH 3 RATE PLAN CHANGE FLAG
- 948 — MONTH 3 RATE PLAN

- 949 — QUARTER'S AIRTIME PERIOD 1 AVERAGE USAGE
- 950 — QUARTER'S AIRTIME PERIOD 2 AVERAGE USAGE
- 951 — QUARTER'S AIRTIME PERIOD 3 AVERAGE USAGE

METHOD OF SELECTING THE MOST COST EFFECTIVE CELLULAR SERVICE PLAN PROVIDED BY CELLULAR TELEPHONE RESELLERS TO MULTI-LINE CUSTOMERS

This is a continuation-in-part of application Ser. No. 07/473,787, filed Feb. 1, 1990, U.S. Pat. No. 4,979,207.

BACKGROUND OF THE INVENTION

The present invention is generally related to cellular telephone billing systems, and more particularly to a method of selecting the most cost effective service plan provided by cellular telephone resellers to multi-line customers.

Cellular telephone billing systems currently accept cellular telephone call detail data on a periodic basis by electronic transmission or on magnetic media from cellular telephone carriers, process the call detail data on the tapes, and typically generate monthly invoices for the user associated with each cellular telephone number. For a multi-line customer owning a large number of cellular telephones with associated cellular telephone numbers, a different monthly invoice (in varying formats) is typically generated by a reseller for each of the cellular telephone numbers. Each such monthly bill may be based on different cellular service plans, since a reseller typically offers several different service plans for each cellular telephone system providing service to the same market. As a result, it is extremely difficult to determine for each cellular telephone if a different service plan may be more cost effective than the current service plan. Therefore, for the foregoing reasons, there is a need to provide on a periodic basis, both consolidated cost and usage information for the cellular telephones owned by a multi-line customer and cost estimates for the eligible cellular service plans for each of its cellular telephones users, in order to efficiently and cost effectively make use of the cellular telephones it owns.

OBJECTS OF THE INVENTION

Accordingly, it is an object of the present invention to provide an improved cellular telephone billing system that provides both billing information for multi-line customers for cellular telephone services and cost information for current and alternative cellular service plans.

It is another object of the present invention to provide a unique method of selecting the most cost effective service plans provided by cellular telephone resellers to multi-line customers, in order to efficiently and cost effectively make use of the cellular telephones it owns.

Its is also an object of the present invention to provide multi-line customers with reports containing information which permits the subscription to the most cost-effective Cellular Service plans.

BRIEF DESCRIPTION OF THE DRAWINGS

FIG. 3 illustrates a call detail record and a customer detail record for a key identification number and corresponding information format.

FIG. 4 illustrates two information formats for corresponding key identification numbers.

FIG. 9, including

FIG. 10, including FIGS. 10A, 10B and 10C illustrate the data elements of the candidate file and the rate plan analysis file.

DETAILED DESCRIPTION OF THE PREFERRED EMBODIMENT

Figure 1:
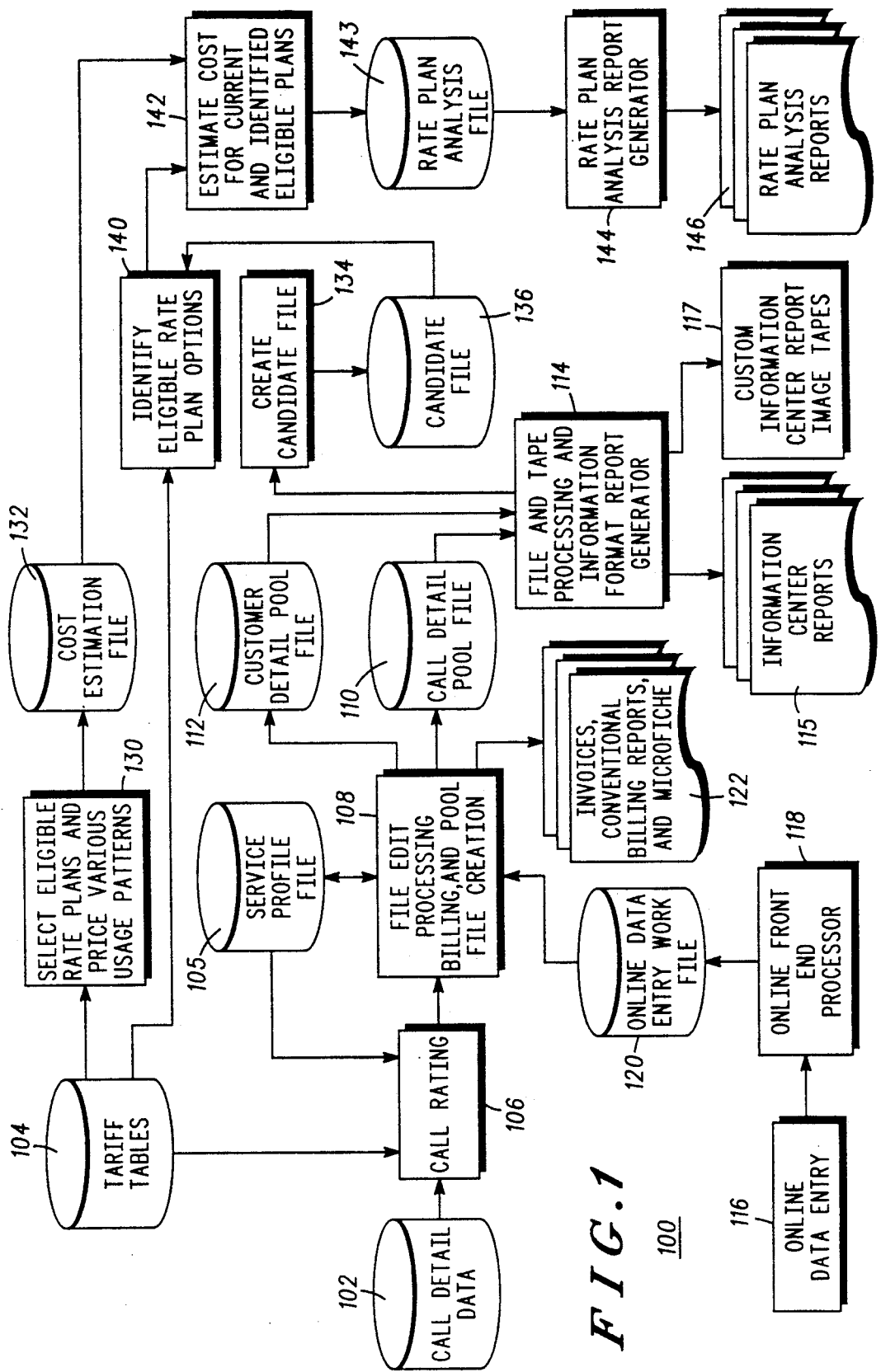
FIG. 1 is a diagram of a cellular telephone billing system embodying the present invention.

Referring to FIG. 1, there is illustrated a digram of a cellular telephone billing system 100 embodying the present invention. Billing system 100 process call detail records of cellular telephone calls made by cellular subscribers or users in various cellular systems operated by cellular carriers throughout the United States and/or other countries of the world. For each cellular telephone call made by or to a user, at least one call detail record is created in the cellular system processing the call. Each such call detail record includes information relating to the call, including, but not limited to, the cellular telephone number, the electronic serial number of the cellular telephone, the called telephone number, the time the call was placed, the time duration of the call, and other information depending on the cellular carrier processing the call. On a periodic basis, the call detail records accumulated by a cellular carrier are processed to produce cellular telephone bills for each user for which calls were processed.

A reseller of cellular services obtains cellular telephone numbers from carriers in a number of different cities. The reseller provides telephone numbers directly to a user and then bills the user typically on a monthly basis for the telephone calls made by the user. In order for the reseller to generate the monthly bills, billing system 100 is utilized to process on a periodic basis call detail records from multiple carriers for each user telephone number billed by the reseller.

For a multi-line customer which owns a number of cellular telephones operated by its user-employees, it is desirable to receive consolidated billing and usage information and estimated costs for other eligible service plans for all of its cellular telephones as well as individual bills for each of its user-employees. According to a novel aspect of the billing system of the present invention, a unique key identification number is associated with each multi-line customer. An information format with variable-length fields is associated with one or more user-employees of a multi-line customer so that call detail records may be pooled and processed for providing consolidated billing and usage information for all of its cellular telephones and estimated costs for other eligible service plans as well as individual bills for each of its user-employees. Illustrative call detail records 301 and 302 including the key identification number and the information format are shown in FIG. 3. As illustrated in FIG. 4, the number and length of the subfields in the information formats 401 and 402 can be tailored to the specific data management and reporting functions desired by the multi-line customer.

In the diagram of FIG. 1, call detail data 102 is received from cellular carriers in many different cities or geographical areas. The call detail data 102 from each carrier may be received on magnetic tapes, cartridges, data sets or other suitable storage media, may be received electronically, and may be received in a number of different data formats. Next, at block 106, the call detail data 102 is batch processed on a periodic basis to reformat, rate, add the user's key identification number and information format, and consolidate the new call detail data with the previous data, using tariff tables 104 and service profile file 105.

Next, at block 108, according to the present invention, the previously collected call detail data from block 106 may be processed to select all records including a key identification number and create two data pools or files, called the call detail file 110 and the customer detail file 112. As illustrated in FIG. 3, records 302 in customer detail file contain customer related information, including, but not limited to, the billing account number 323, cellular telephone number 324, electronic serial number 325 of a cellular telephone, rate plane 326, features plan 327, air time charges 328, landline charges 329, feature charges 330, roaming charges 331, and taxes 332. As illustrated in FIG. 3, records 301 in call detail file contain information related to the calls placed by the cellular telephone, including, but not limited to, cellular telephone number 313, electronic serial number 314 of a cellular telephone, the called telephone number 315, the date 316 the call was placed, the time 317 the call was placed, and the duration 318 of the call.

The customer detail file 112 and call detail file 110 may be outputted on tapes or other suitable media or may be transmitted electronically and are further processed at block 114. In the preferred embodiment, the processing of blocks 106 and 108 is performed using conventional billing software which has been modified to include the ability to associate key identification numbers and information formats for all cellular telephone numbers of each multi-line customer. One source of such software is Cincinnati Bell Information Systems, Inc.

Online data entry at block 116, which utilizes online front end processor 118 to produce an online data entry work file 120 which is transferred to block 108 where it is utilized to maintain service profile file 105, to provide and/or edit the unique key identification number and the information format for cellular telephone numbers of a new multi-line customer and/or users, and to correct or provide additional call detail data.

Returning to block 108, the call detail records may be processed further to create user invoices, pre-selected management reports, and fiche data sets 122.

Returning to block 104, the tariff tables are processed at 130 to select those rate plans which are currently offered for subscription and populate the cost estimation file 132.

Figure 10B:
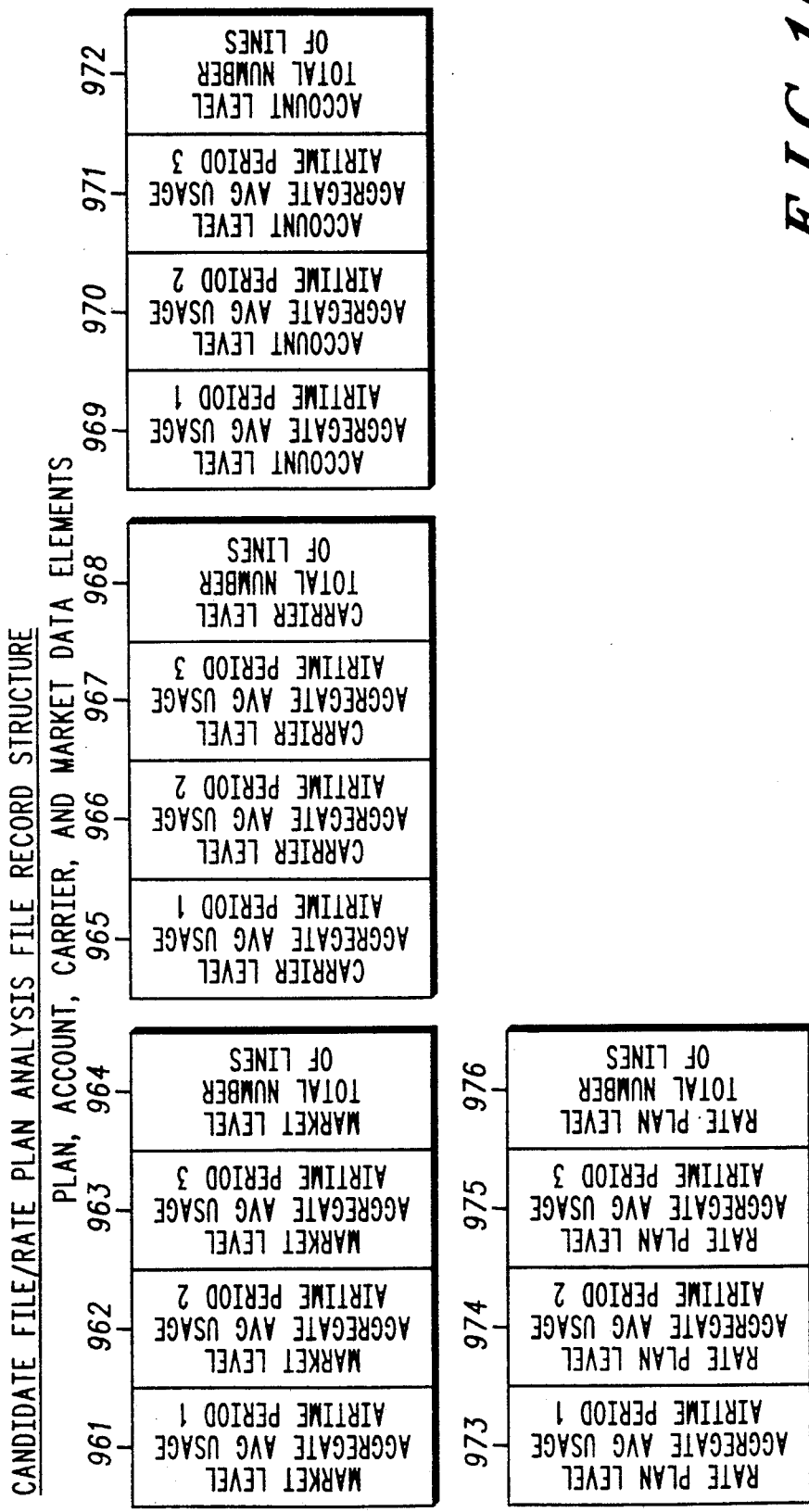
Figure 10C:
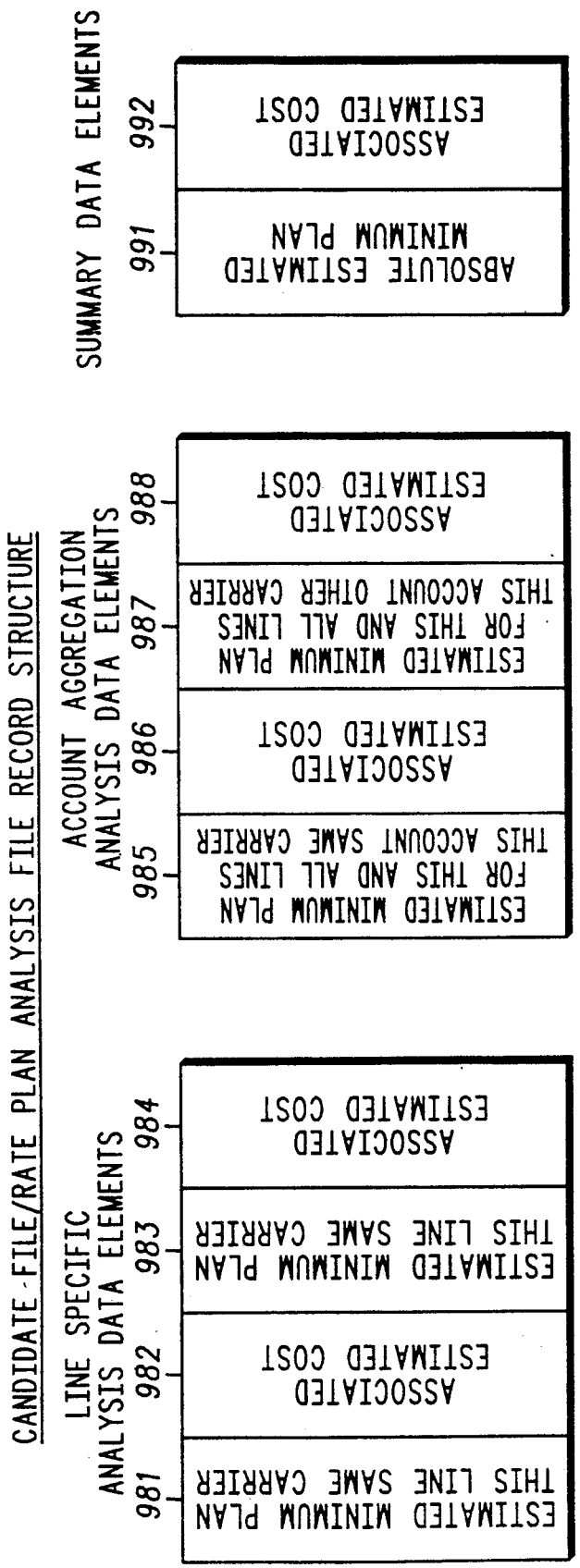

Returning to block 114, the customer detail pool file 112 is processed at 134 to create the candidate file 136, consisting of one or more records per cellular telephone number per billing month. As illustrated in FIG. 10, records in the file contain, but are not limited to, the listed general data elements, periodic data elements, plan, account, carrier, and market data elements, line specific analysis data elements, account aggregation analysis data elements, and summary data elements.

At block 140 the plan, account, carrier, and market data elements 961 through 976 of the candidate file 136 are examined and compared with tariff provisions of the tariff tables 104 resulting in the identification of rate plans to which the cellular telephone number might be subscribed. The current rate plan 918 and all eligible rate plans are then costed at 142, resulting in the evolution of the candidate file 136 to the rate plan analysis file 143.

The rate plan analysis file is then processed at 144 producing the rate plan analysis reports 146.

Figure 2:
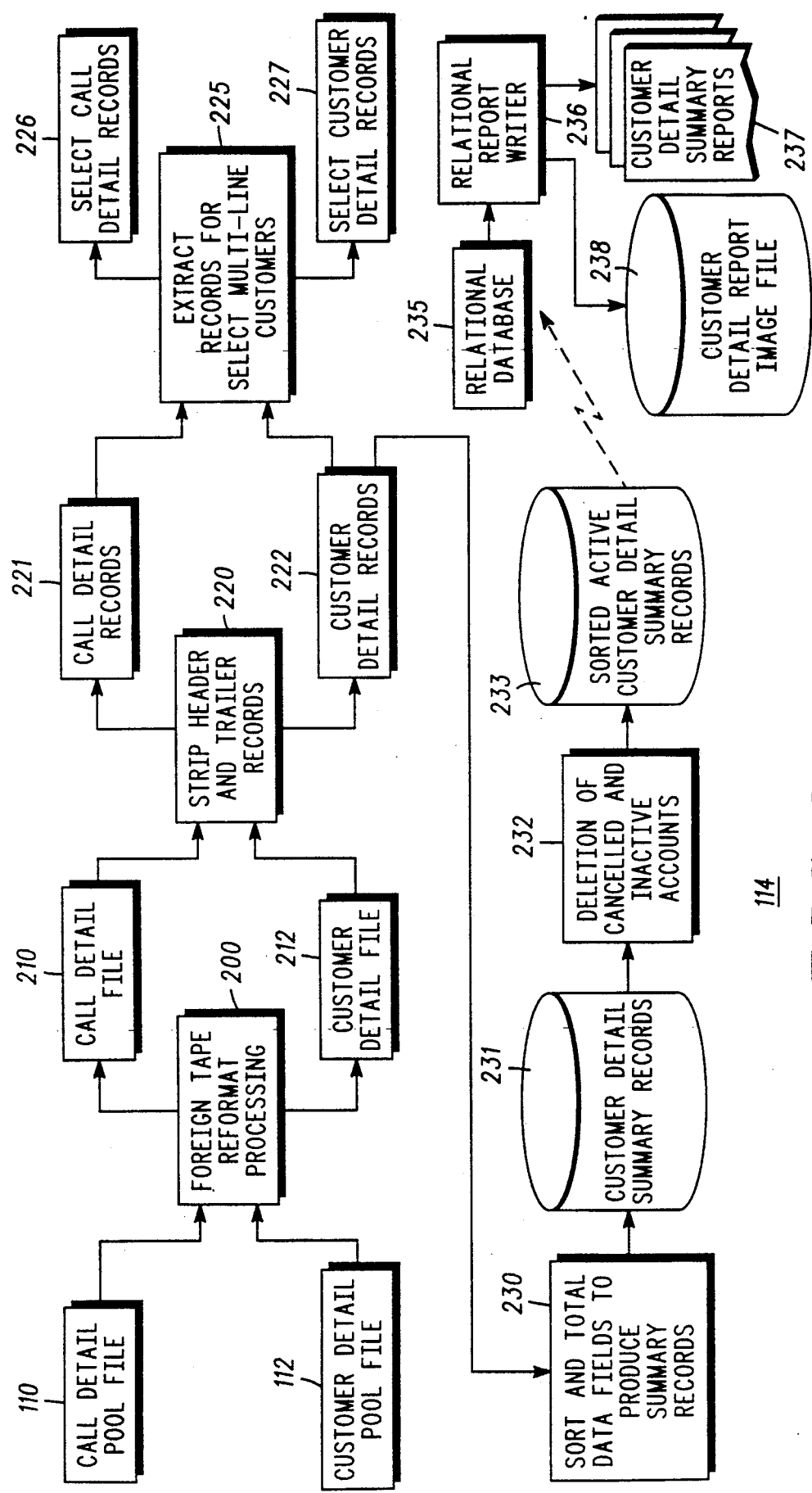
FIG. 2 is a flow diagram for processing call detail and customer detail files produced in the cellular telephone billing system in FIG. 1.

Referring next to FIG. 2, there is illustrated a flow diagram for block 114 in FIG. 1, where further processing of tapes containing the call detail file 110 and customer detail file 112 is performed. Upon receipt of new tapes containing the call detail and customer detail files 110 and 112, the tapes are processed at block 200 using a mainframe computer, such as an International Business Machines 3090, to produce internally formatted copies of the call detail file 210 and the customer detail file 212. Once copies 210 and 212 are made, tapes 110 and 112 are placed in a fire-proof vault for safe storage.

Next, at block 220, a file maintenance utility, such as the utility called "File-AID" available from COMPUWARE, is executed on the mainframe computer to produce subsequent generations of 221 and 222 of the call detail 210 and customer detail file 212, respectively, in which the header and trailer records have been removed. Then, at block 225, a software application program is executed on the mainframe computer to create, on the basis of the key identification number for a selected multi-line customer, tapes 226 and 227 from abbreviated files 221 and 222, respectively, which contain selected data relating to the users of that multi-line customer.

Next, at block 230, another software application program is executed on the mainframe computer for sorting the records in the abbreviated customer detail file 222 and computing the total values of the quantities in certain data fields, such as, for example, the data fields for roaming charges, air-time charges, and landline charges to produce a sorted customer detail summary file 231. This software application program also incorporates into file 231 other selected information from the customer detail records from file 222, and replaces embedded market identifiers of the conventional billing software in file 222 with different market identifiers using a general usage table. Then, at block 232, another software application program is executed on the mainframe computer for deleting records for canceled users and for users with no account level charges in file 231. Thereafter, the data is transferred from the mainframe computer to a personal computer 233 (such as an $80 \times 86$ microprocessor based personal computer using MS-DOS or PC-DOS operating system), using a commercially available file transfer program (such as the program called "SIM/XFER" available from Simware, Inc.). The data is then transferred to a relational data base structure 235 (such as that provided by dBASE III Plus from Ashton Tate Corporation). Next, at block 236, data 235 is sorted and totaled on the personal computer and reports 237 are printed using a report program generator (such as the program called "R & R Relational Report Writer" available from Concentric Data Systems, Inc.). The report program generator 236 includes a process such that sorting is performed for each multi-line customer using the key identification number and information format for that customer. Print images of some of the reports are uploaded from the relational data base 235 to the mainframe computer using a file transfer program. The uploaded reports may then be transferred to individual mainframe accounts 238 on another mainframe computer.

Referring next to FIG. 4, there are illustrated two information formats 401 and 402 for key identification numbers for multi-line customer A and multi-line customer B, respectively. According to the present invention, the information format is a data field which can be sub-divided into a variable number of sub-fields each having different lengths. In the preferred embodiment, the information format is a fifteen character field with four sub-fields of variable length. Information format 401 has three sub-fields 411–413 having three characters and one sub-field 414 having six characters. Information format 402 has four sub-fields 421–424 having three, four, eight, and zero characters, respectively. For the sales organization of customer A, sub-fields 411, 412, 413 and 414 of information format 401 are associated with data fields for product, division, region and district, respectively. For the service organization of customer B, sub-fields 421, 422 and 423 of information format 402 are associated with data fields for region, department, and employee number, respectively. Sub-field 424 is a zero length filler field. As illustrated by information formats 401 and 402, the sub-fields selected for a particular multi-line customer may be varied in length to suit that customer's specific needs.

The structure (sizing of sub-fields) of an information format is specific to a multi-line customer, and therefore, is also specific to the associated key identification number. The data contained within the information format sub-field in call detail and customer detail records is specific to one or more users.

Figure 5:
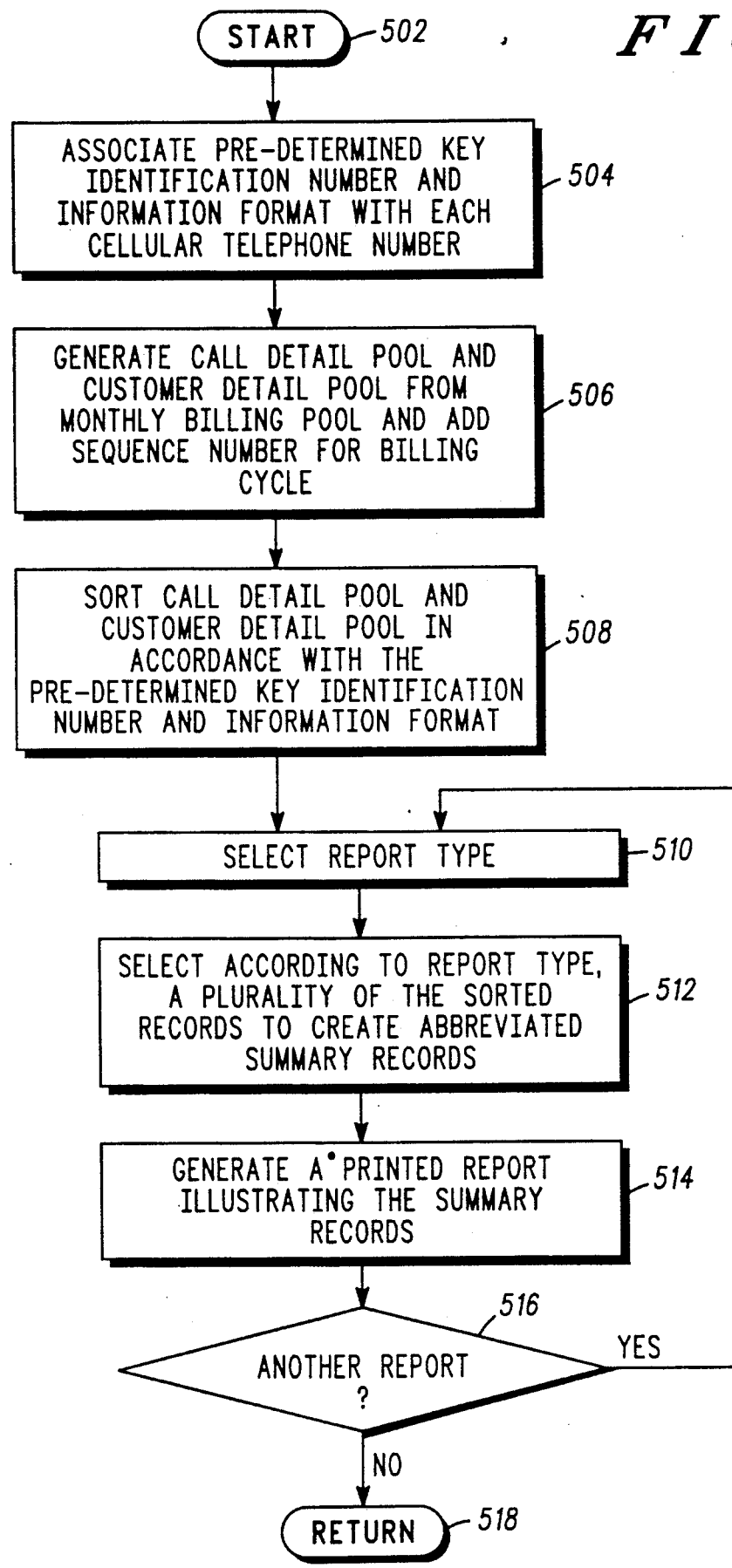
FIG. 5 is a flow diagram of the process for producing selected reports for a multi-line customer having a pre-assigned key identification number and pre-assigned information format.

Referring next to FIG. 5, there is illustrated a flow diagram of the process for producing selected reports for a multi-line customer having a predetermined key identification number and one or more information formats (with same number of sub-fields but different information in each). The process is entered at START block 502 and proceeds to block 504, where the predetermined key identification number and information format are associated with each cellular telephone number or user of a multi-line customer. Next, at block 506, the call detail and customer detail files are generated from the monthly billing pool. Also, a sequence number for the billing cycle is added to each record to identify that billing cycle. Then, at block 508, the call detail and customer detail files are sorted in accordance with the predetermined key identification number and information format of the multi-line customer.

Next, at block 510, a report type is selected for a number of different reports each including a set of data sub-fields from the call detail and customer detail files. Then, at block 512, a plurality of the sorted records are selected on the basis of the desired report type to create abbreviated summary records. Last, at block 514, a printed report is generated illustrating in graphic form the selected summary records. Thereafter, at block 516, a check is made to determine if another report type has been selected. If so, YES branch is taken back to block 508 to repeat block 508–514 for another report type. In another report type has not been selected, NO branch is taken form block 516 to block 518 to return to other tasks.

Figure 6:
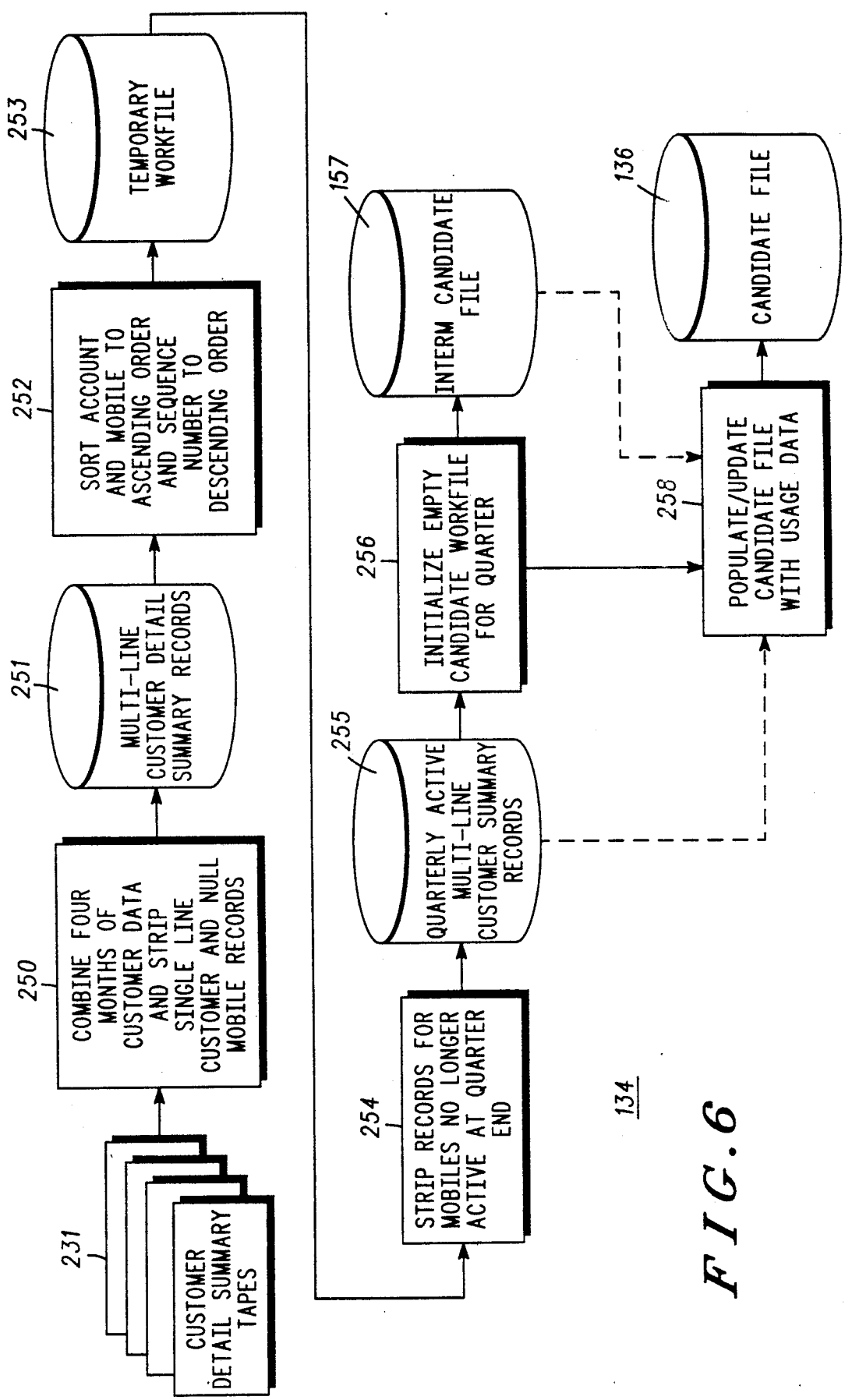
FIG. 6 is a flow diagram for processing of customer detail summary files produced in the cellular telephone billing system in FIG. 2.

Referring next to FIG. 6, there is illustrated a flow diagram for block 134 in FIG. 1 where further processing of the customer detail summary tapes 231 is performed. A customer detail summary tape 231 is produced for each billing month by the cellular telephone billing system at block 114 in FIG. 1. In the preferred embodiment of the current invention, data from four months is required to produce the multi-line customer detail summary records file 251. The four months are the three of the previous quarter, to which file 251 will apply, plus the first month of the quarter during which processing will occur. The customer detail summary tapes 231 for these four months may be processed individually, or in groups. These tapes 231 are processed at 250 on a mainframe computer, such as an International Business Machines 3090, using the utility "File-Aid" available from COMPUWARE, to combine multiple tapes and strip records applicable to single line customers, special sub-header records, producing the multi-line customer detail summary records file 251.

Next, at block 252 the file maintenance utility is used to sort file 251 according to ascending order of its cellular telephone numbers and descending order of the billing period sequence numbers, producing a temporary workfile 253. At block 254 this temporary workfile 253 is stripped of those records for which service was not active during the third month of the quarter being analyzed, producing the quarterly active multi-line customer summary record file 255.

Next at block 256, an application program uses file 255 to create an empty a candidate file 136, which is then populated by the process at block 258 with one record per active cellular telephone number.

Figure 7:
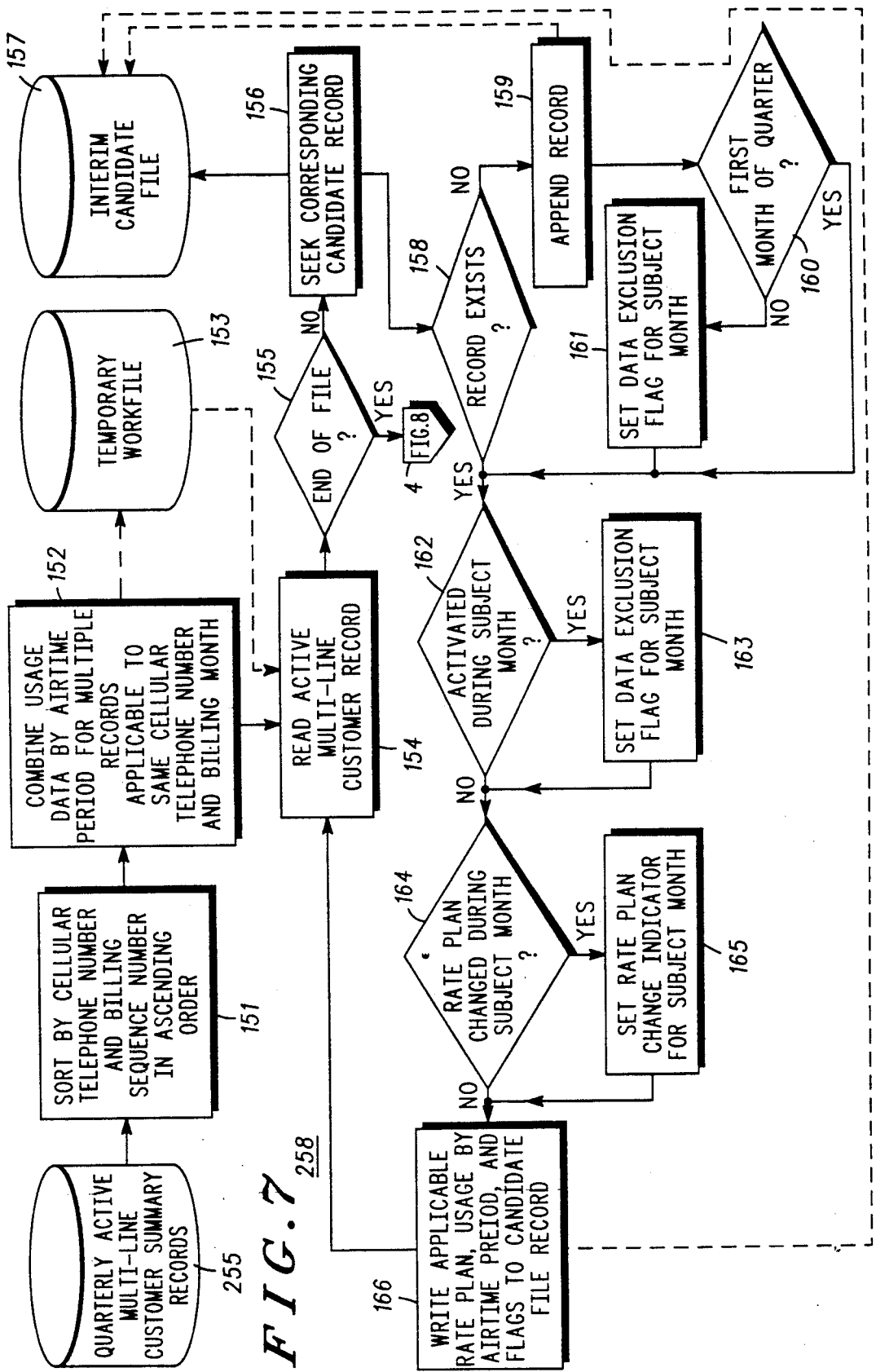
FIGS. 7 and 8 constitute a flow diagram for processing the current quarter active multi-line customer summary records, produced in the cellular telephone billing system in FIG. 2, in the creation and initial population of the candidate file.

Referring next to FIG. 7, there is illustrated a flow diagram for process 258 in FIG. 6, wherein the quarterly active multi-line customer summary record file 255 is populated. After the file 255 is initially produced, it is sorted at 151 according to ascending cellular telephone number and billing period sequence number order by the mainframe file utility. The file is then read, and multiple records for a single cellular telephone number for the same billing month are combined at 152 such that the resulting temporary workfile 153 contains a maximum of three records per cellular telephone number (one record per billing month).

At block 154 a processing loop begins in which each record in file 153 is read. If the seek for a corresponding record in file 157 at 156 is negative, then a record is appended at 159 to file 157. The test at block 160 causes the data exclusion flag to be set at 161 in all cases except records for the first month in the quarter. The test at clock 162 causes the data exclusion flag to be set at block 163 for recording in which the cellular telephone number was activated during the month, and the test at block 164 causes the rate plan change flag to be set at block 165 when a rate plan change occurred during the month. The data read at block 154, and the flags are then written back to the record, and the loop continues at 154 until an end of file is encountered at 155, at which point the process diagram is continued to FIG. 8.

Figure 8:
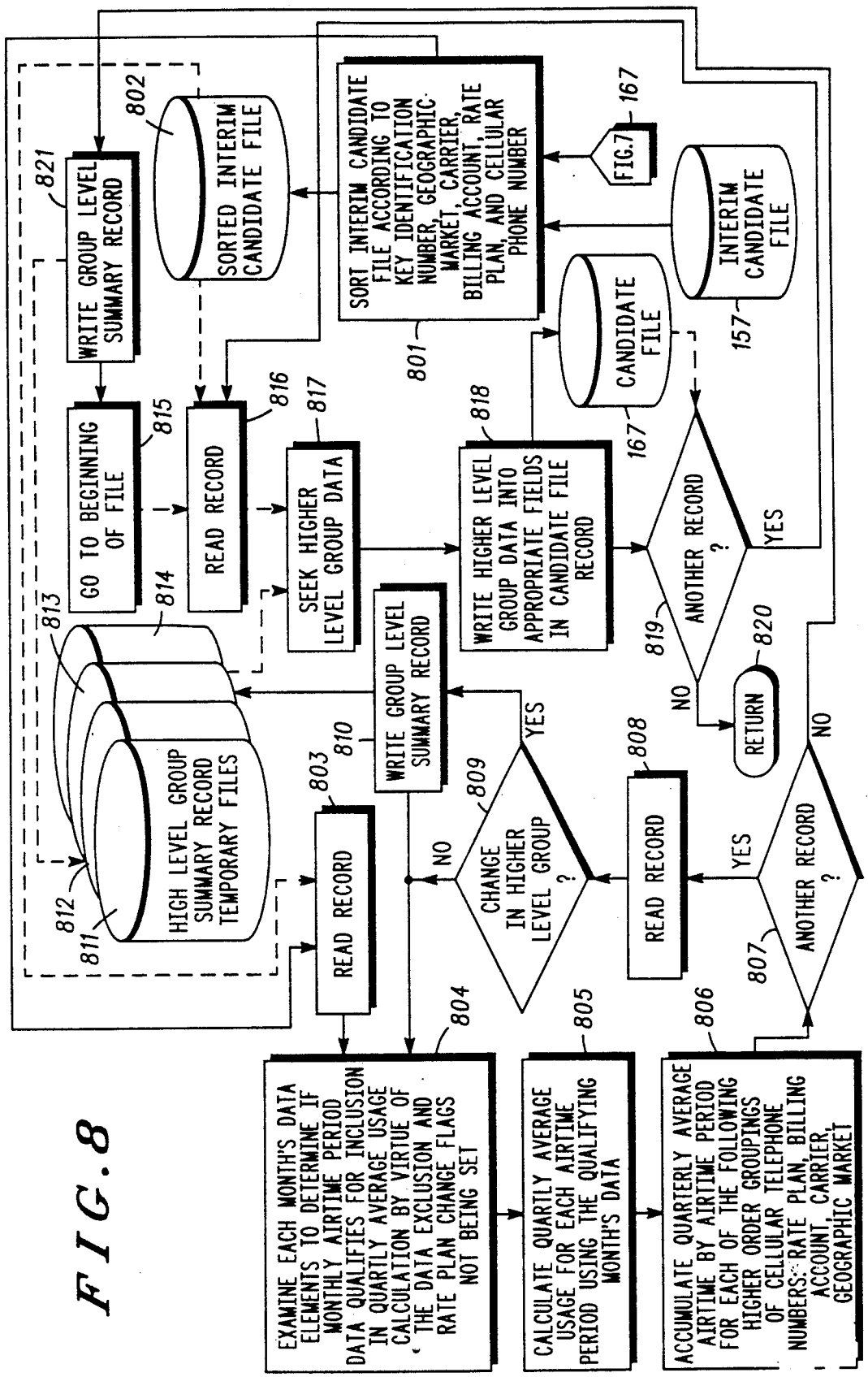

Referring to FIG. 8 there is illustrated the continuation of the process started in FIG. 7. Using the mainframe computer file aid, the interim candidate file 157 is sorted at 801 according to key identification number 911, geographic market 913, carrier identification code 914, billing account number 916, current rate plan 918, and cellular telephone number 915, resulting in the creation of a sorted interim candidate file 802.

Next, at block 803, an application program begins with a processing loop which reads each record of file 802. At block 804 the data exclusion flag (934, 940, and 946 for months 1, 2, and 3, respectively) and rate plan change flag (935, 941, and 947 for months 1, 2, and 3, respectively) are examined. Next at block 805, the airtime period 1 usage fields (931, 937, and 943) are summed and divided by the number of months for which neither exclusion flag was set. The result is written to field 949 and accumulated at block 806 in individual accumulators for each of the higher level groupings (rate plan, account, carrier, and geographical market). The airtime period 2 usage fields (932, 938, and 944) are processed in an identical manner, with results being written to field 950 and accumulated at block 806 in individual airtime period 2 accumulators for each of the higher level groupings. The airtime period 3 usage fields (933, 939, and 945) are processed in an identical manner, with results being written to field 951 and accumulated at block 806 in individual airtime period 3 accumulators for each of the higher level groupings. Until the test at block 807 detects an end of file condition, the process continues with another record read at 808. On detection at 809 of a change in any higher level group, a summary record containing all three airtime period accumulators for that group is written at 810 to the appropriate temporary file (811, 812, 813, or 814), and the loop continues at 804.

Returning to block 807, when another record is not detected, control passes to block 821 at which point a summary record containing all three airtime period accumulators for each group is written to the temporary files 811, 812, 813, and 814. Next at 815 the record pointer for file 802 is reset to the first record, and a processing loop beings with a read at block 816. At block 817, a seek is made to each of the temporary higher level group accumulator files (811, 812, 813, and 814) to locate the applicable accumulator record. At block 818, all data fields from the interim candidate file 802 are written to identical fields in the candidate file 136. In addition, the higher level accumulator data obtained from the seek is written to the plan, account, carrier, and market data elements (fields 961 through 976) of the candidate file 136.

Figure 9A:
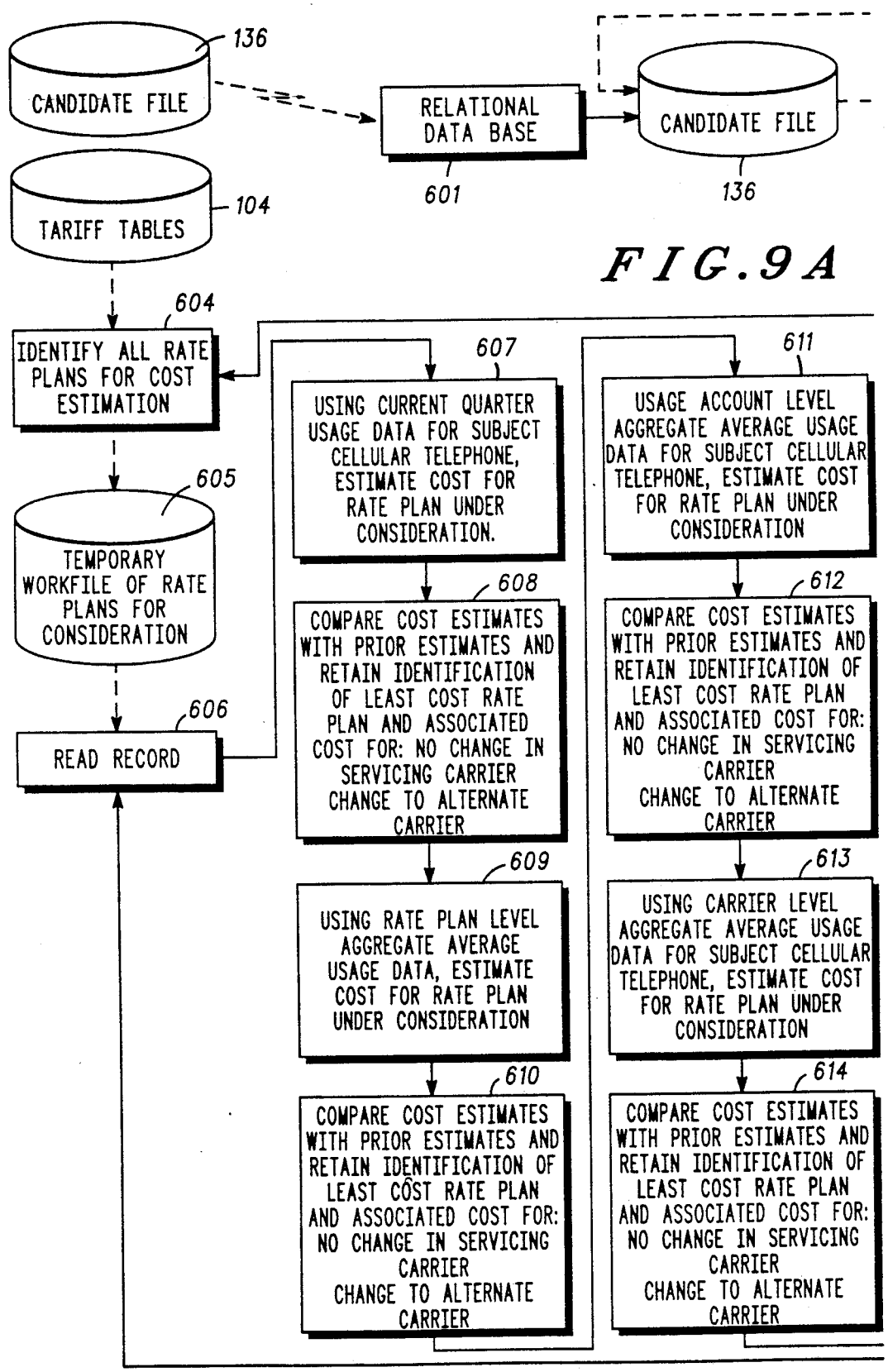
FIGS. 9A and 9B is a flow diagram for processing the candidate files, tariff tables, and usage cost estimation file produced in the cellular telephone billing system in FIG. 1, in the population of the candidate file, created in the cellular telephone billing system in FIG. 8, with line specific and high level group analysis data.
Figure 9B:
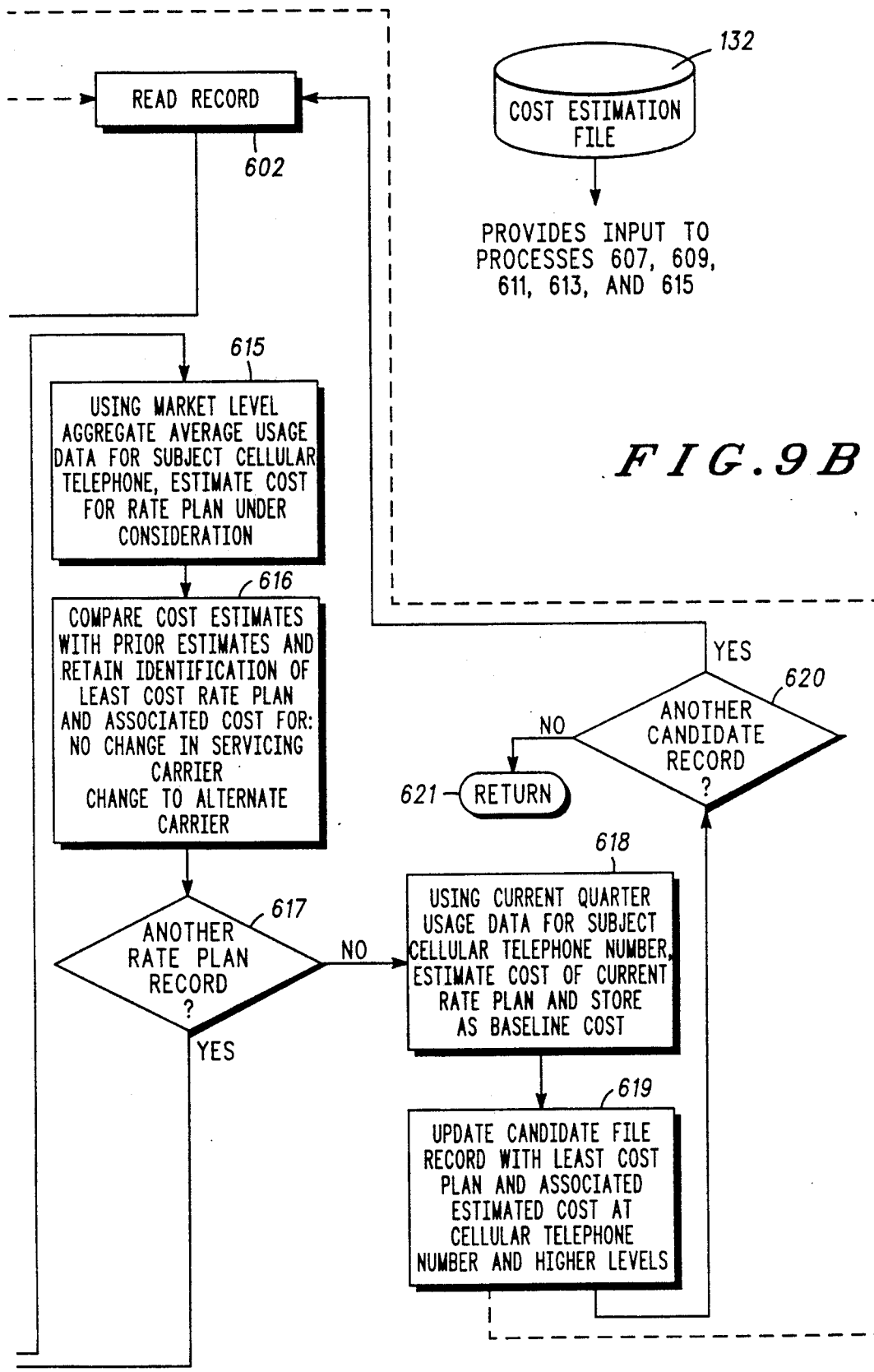

Referring to FIG. 9, there is illustrated a flow diagram of the processing of the candidate file 136, the tariff tables 104, cost estimation file 132 to populate the line specific analysis data elements (981 through 984) and higher level group aggregate analysis data elements, such as but not limited to the account aggregation analysis data elements (985 through 988), and the summary data elements 991 and 992 of the candidate file 136.

Referring to FIG. 9, a commercially available file transfer program (such as the program "SIM/XFER" available from SIMWARE Inc.) is used to transfer the candidate file 136 to a personal computer (such as an X 80×86 microprocessor based personal computer using MS-DOS or PC-DOS operating system). At block 601, the file is imported into a relational data base structure (such as that provided by DBASE III Plus from Ashton Tate Corporation). Next, at block 602 an applications program beings a processing loop. First, a record of the candidate file 136 is read. Next, at block 604, the tariff tables are searched for all rate plans, both on the same serving cellular carrier, and the alternate carrier, which may be considered as alternatives to the current rate plan 918. The determination of which plans are to be considered is a function of the rate plan rules, and may take into account one or more of such factors as the total number of minutes usage by the cellular telephone number (i.e. the sum of fields 949 through 951), and/or the number of lines (fields 964, 968, 972, and 976) in a higher level group, and/or the aggregate average usage in a higher level group. The rate plan codes for the eligible plans are written to a temporary workfile 605.

Next a nested processing loop begins with the reading at block 606 of a record from file 605. Referring to block 132, it is noted that this file provides input to the processes at blocks 607, 609, 611, 613, and 615. File 132 consists of a series of tables, one for each currently offered rate plan, indexed by the number of minutes, and the ratio of airtime period 1 usage. A sample "page" of this file is illustrated in Table 1.

At block 607, the current rate plan 918 is priced by using the ratio of the quarter's airtime period 1 average usage 949 to the sum of the three airtime period average usage (fields 949/field 949 field 950 + field 951) to determine the airtime mixture column, and the sum of the airtime fields (field 949 + field 950 + field 951) for the usage index. The estimated cost is stored for update at 619. Next, at block 608, the resulting cost estimates for all prior plans are compared and the identification and associated cost of the least cost plan on the same carrier and on the alternate carrier are retained.

Processing of blocks 609 and 610, 611 and 612, 613 and 614, and 615 and 616 is handled in a similar manner, except that in each case, one of the higher level data aggregation fields are used—961 through 963 for market level, 965 through 967 for carrier level, 969 through 971 for account level, and 973 through 975 for rate plan level.

When no more rate plan records are detected at block 617, control passes to block 618 in which the estimated baseline cost 922 is calculated from the current rate plan 918 and the quarter's airtime period data (949, 950, and 951). Next, at block 619, the candidate file 136 is updated with the results of the analysis from blocks 607 through 616. Control then passes back to the higher level processing loop, with a test at block 620 for another candidate file record.

Figure 11:
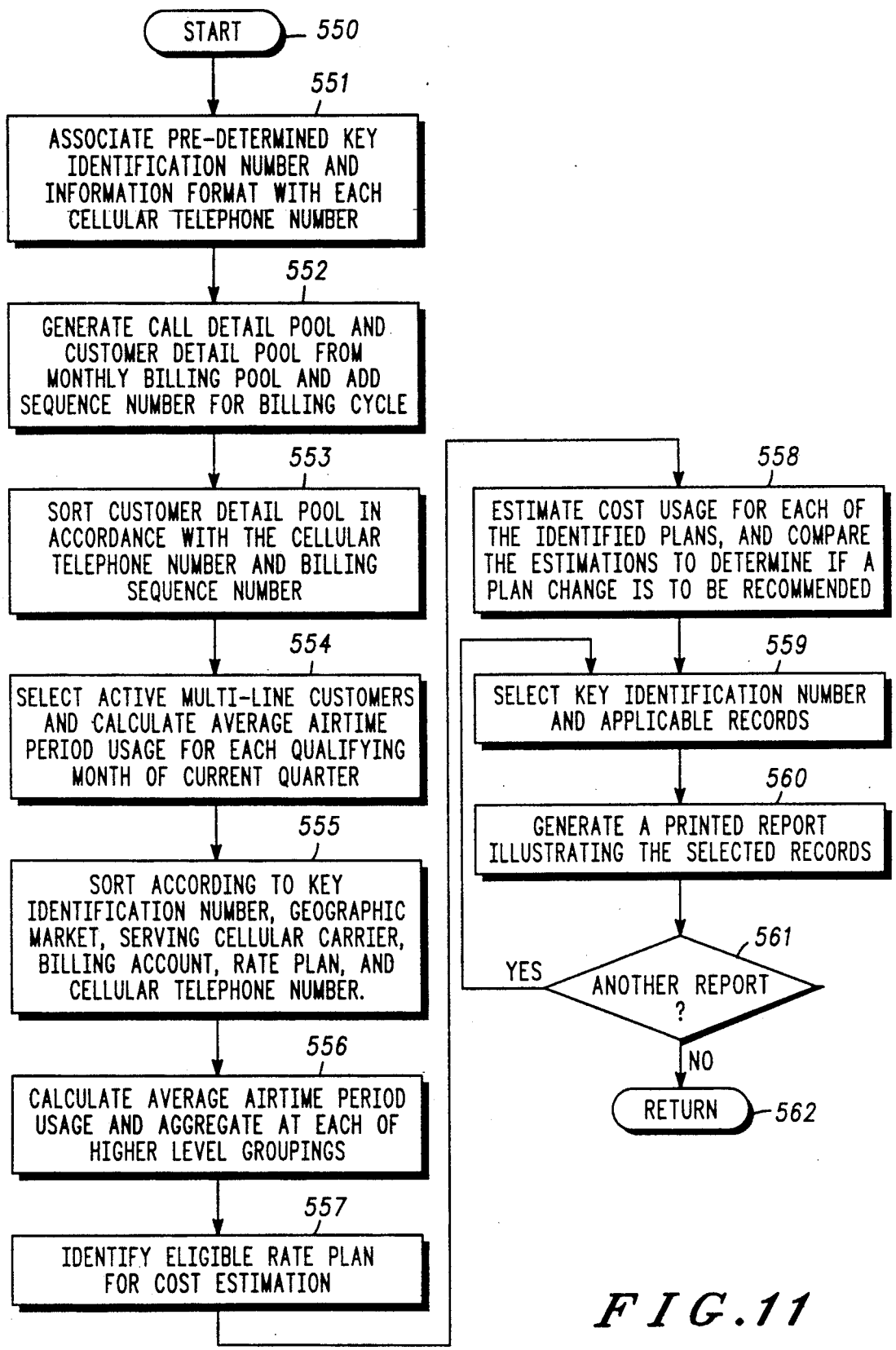
FIG. 11 is a flow diagram of the process for producing rate plan analysis reports for select active multi-line cellular telephone subscribers.

Referring to FIG. 11, there is illustrated a flow diagram for the process of preparing the rate plan analysis reports for active multi-line customers. The process is entered at START block 550 and proceeds to block 551, where the predetermined key identification number and information format are associated with each cellular telephone number. Next, at block 552, the call detail pool and customer detail pool files are created from the monthly billing pool. Also, a billing cycle sequence number is added to each record to identify the billing cycle. Then, at block 553 the customer detail pool file is sorted in accordance with the cellular telephone number and billing sequence number. At block 554, those cellular telephones which are active at the end of the quarter are selected, and average monthly airtime is calculated using data from those months in which the telephone was in service for the full month, and for which no rate plan change occurred. At block 555 the file is sorted according to the grouping hierarchy—key identification number, geographic market, cellular carrier, billing account number, rate plan, and cellular telephone number. Next at block 556 the average airtime period usage is calculated for the cellular telephone number, and such averages are aggregated for all cellular telephone numbers in the higher level groupings. At block 557, the information from block 556 is used to identify those rate plans for which a cellular telephone may be considered—individually, or as a member of a higher level grouping. The estimated cost for each identified rate plan in determined at block 558. At block 559 the key identification number of interest is selected, and a report is generated at 560. While processing at 561 detects additional reports are desired, control loops to block 559.

In summary, a unique billing system has been described for billing multi-line customers for cellular telephone services and estimated costs for other eligible service plans, wherein each user has a unique key identification number and may have an information format with variable-length and variable-content fields for defining data management and reporting functions. As result, a customer owning a number of cellular telephones may be assigned a predetermined identification number and corresponding information format for obtaining consolidated billing and usage information and estimated costs for other eligible service plans for all of its cellular telephones as well as individual bills for each of its users.

TABLE 1

| | Market: FTCB Rate Plan: FX1 Cost Estimation File | | | |
|---|---|---|---|---|
| STEP MINUTES | 75% PEAK USAGE | 85% PEAK USAGE | 90% PEAK USAGE | 95% PEAK USAGE |
| 0 | 17.950 | 17.950 | 17.950 | 17.950 |
| 3 | 19.443 | 19.518 | 19.555 | 19.593 |
| 6 | 20.935 | 21.085 | 21.160 | 21.235 |
| ... | ... | ... | ... | ... |
| ... | ... | ... | ... | ... |
| 3000 plus | 888.700 | 927.040 | 946.210 | 965.380 |

We claim:

1. A method of selecting one of a plurality of rate plans for cellular radiotelephone users each having corresponding user records from one or more cellular systems gathered in a billing pool, said billing pool including user records for at least a current billing period and a previous billing period, each user record including a current rate plan and usage information for the current and previous billing periods, said method comprising the steps of:
   a) selecting all user records from the billing pool for each cellular radiotelephone user which has non-zero usage information for the current billing period;
   b) creating a current usage pool and a previous usage pool by accumulating the usage information in the selected user records for the current billing period and the previous billing period, respectively;
   c) creating a summary user record for each cellular radiotelephone user by accumulating the usage information in all corresponding user records;
   d) appending current and previous usage pools to each summary user record;
   e) calculating costs for each cellular radiotelephone user based upon the accumulated usage information in the corresponding summary user record and at least two of the rate plans; and
   f) selecting for each cellular radiotelephone user the rate plan which has the lowest calculated cost.

2. The method according to claim 1, further including the step of presenting, for each cellular radiotelephone user, the corresponding selected rate plan, current rate plan, and accumulated usage information in human perceptible form.

3. The method according to claim 1, wherein said step a) further includes the step of excluding all user records for each cellular radiotelephone which has changed current rate plans during the current or previous billing periods.

4. The method according to claim 1, wherein said step a) further includes the step of creating a sequence number associated with a selected radiotelephone user.

5. The method according to claim 4, wherein said step a) further includes the step of sorting said selected user records in accordance with said sequence number.

6. The method according to claim 1, wherein said step a) further includes the step of adding to each user record a key identification number and an information format having at least one sub-field associated with at least one user; and wherein said method further includes the steps of sorting the summary user records by at least one key identification number to produce a file of summary user records for said at least one key identification number, selecting information from the summary user records in said file in accordance with said information format, and presenting said summary user records in human perceptible form.

7. A key account billing controller for use with a digital computer, the controller comprising:
   a computer program storage medium having a computer program to be executed by the digital computer stored thereon, the computer program comprising:
   first means for processing cellular radiotelephone call data including a multiplicity of user records from one or more cellular systems gathered in a billing pool for billing users and adding to each user billing record a key identification number and an information format having at least one sub-field associated with at least one user; and
   second means for selecting all user records from the billing pool for each cellular radiotelephone user which has non-zero usage information for the current billing period, creating a current usage pool and a previous usage pool by accumulating the usage information in the selected user records for the current billing period and the previous billing period, respectively, creating a summary user record for each cellular radiotelephone user by accumulating the usage information in all corresponding user records, appending current and previous usage pools to each summary billing record, and calculating costs for each cellular radiotelephone user based upon the accumulated usage information in the corresponding summary user record and at least two of the rate plans; and
   third means for sorting the summary user records by at least one key identification number to produce a file of summary user records for said at least one key identification number, selecting information from the summary user records in said file in accordance with said information format, and presenting said summary user records in human perceptible form.

* * * * *